June 27, 1967  K. D. KILBURN  3,327,718
TOBACCO-SMOKE FILTERS
Filed Oct. 9, 1964
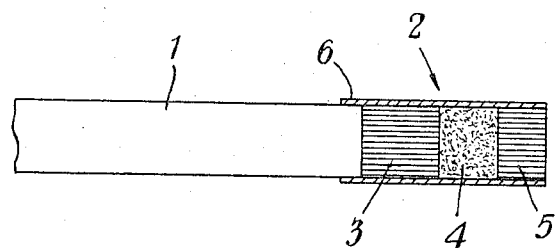
INVENTOR
KEITH DOUGLAS KILBURN
By
Kane, Dalsimer and Kane
ATTORNEYS

United States Patent Office 3,327,718
Patented June 27, 1967

3,327,718
TOBACCO-SMOKE FILTERS
Keith Douglas Kilburn, Southampton, England, assignor to Brown and Williamson Tobacco Corporation, Louisville, Ky., a corporation of Delaware
Filed Oct. 9, 1964, Ser. No. 402,895
Claims priority, application Great Britain, Oct. 15, 1963, 40,690/63
7 Claims. (Cl. 131—262)

This invention relates to filters for tobacco smoke, and more specifically to filters for removing nitrogen dioxide from tobacco smoke.

Many forms of filters for tobacco smoke are known which can remove some of the volatile components in the vapour phase of the smoke to a greater or less extent. Such filters usually act by absorbing or adsorbing the substance or substances to be removed on to a suitable surface, or by providing a suitable reagent which reacts chemically with the substance or substances to be removed.

Hitherto, the use of absorption and adsorption has largely been preferred, since suitable arrangements for effective chemical reaction are difficult to provide. An essential requirement for effective chemical reaction to remove substances from a stream of tobacco-smoke passing through a filter is a high surface area of reagent so that the maximum number of possible reactive sites is available.

The object of the present invention is to effect the removal of nitrogen dioxide from tobacco smoke by the provision of a chemically reactive surface of a very large area.

According to the invention, a tobacco-smoke filter for this purpose comprises an artificial zeolite material capable of acting as a molecular sieve and having a minimum pore size of 4 Angstrom units, which is completely deactivated by water vapour. Preferably the molecular sieve material has a minmum surface area of 5 square metres per gram. If desired, an additional amount of water (up to 30 percent by weight of the weight of deactivated molecular sieve material) over and above the amount required for deactivation may also be incorporated. The expression "completely deactivated" is used here in the sense that the molecular sieve material contains at least sufficient water to remain in equilibrium with air at ambient temperatures saturated with water vapour, that is, no active sites remain for the further adsorption of water at ambient temperatures.

Artificial zeolite materials capable of acting as molecular sieves are well known and commercially available. Their outstanding characteristic is the possession of a molecular structure having a large number of spaces or pores of fixed dimensions in which molecules whose dimensions are smaller than those of the pores can be trapped. A molecular sieve material having a pore diameter of 4 Angstrom units or more will trap water molecules in its pores until substantially all the pores are filled and the material is thus deactivated. Such a deactivated molecular sieve material presents, per unit weight, an extremely large reactive surface to the nitrogen dioxide contained in the smoke-stream, since the diameter of the pores is greater than the maximum molecular dimension of the nitrogen dioxide molecule; the nitrogen dioxide molecules can thus enter the pores to react with the water molecules therein. Also it is believed that the nitrogen dioxide can displace the water molecules from the surface of the molecular sieve material. Thus, the whole of the surface of the material, including that within the pores, is available for reaction.

Hence, since most of the substances contained in tobacco smoke are either too large to enter the pores of the material, or cannot displace the water molecules from the available surface, a convenient and readily available means is provided for the removal of nitrogen dioxide from tobacco smoke.

For the production of cigarette filters, the molecular sieve material may be used in the form of powder or granules which are of a size not greater than 20 mesh but not finer than 150 mesh.

Between 10 and 300 milligrams of the material are required for each filter; the preferred quantity is between 50 and 100 milligrams. The finely divided material may be contained in a cylindrical capsule closed at each end by discs perforated with holes smaller than the particles; or it may be incorporated as granules in the inner portion or portions of a multi-stange filter unit; alternatively, it may be used in powder form of mesh size 120 to 150 by dusting it on to conventional filter materials of fibrous or sheet form.

Specific examples of the invention will now be described in more detail and with reference to the accompanying drawing, which shows a longitudinal section through the mouth end of a cigarette provided with a filter according to the present invention.

As shown, the tobacco rod 1 of a cigarette, composed of blended tobacco designed to be acceptable in the American market, it attached to a multi-stage filter plug generally indicated at 2. The filter plug 2 consists of a first section 3 of fibrous cellulose acetate 14.5 mm. long, a second section 4 consisting of 70 mg. of granules of deactivated molecular sieve material, a third or mouth section 5 of fibrous cellulose acetate similar to that used in section 3 but only 9 mm. long, and an outer wrapper 6. The molecular sieve is a commercially available zeolitic material of mesh size 22–52 B.S. of average pore size 10 Angstrom units, completely deactivated by water. After smoking mechanically groups of ten cigarettes, taking one puff of two seconds duration and 35 cc. volume every minute until 23 mm. of cigarette rod remained, an average reduction in nitrogen dioxide of 20% was observed, as compared with untipped cigarrettes smoked similarly.

The same procedure was repeated using tobacco rod 1 composed of bright Virginia blend designed to be acceptable to the British and European market. The average reduction in nitrogen dioxide observed was 30%.

Cigaretts of similar bright Virginia blend tobacco were attached to filter tips 2 similar to that illustrated but consisting of two sections 3 and 5 of 6 mm. length of fibrous cellulose acetate and a central section 4 containing 100 mg. of molecular sieve material as described above. On smoking groups of five cigarettes by the above described procedure, an average reduction in nitrogen dioxide of 30% was observed.

I claim:

1. A tobacco-smoke filter comprising an artificial zeolite material capable of acting as a molecular sieve and having a minimum pore size of 4 Angstrom units, which is completely deactivated by water vapour thereby providing large reactive surfaces having increased absorption affinity for nitrogen dioxide.

2. A filter according to claim 1, wherein the molecular sieve material has a minimum surface area of 5 square metres per gram.

3. A filter according to claim 1, containing an additional amount of water, amounting to up to 30 percent by weight of the weight of the water deactivated molecular sieve material.

4. A filter according to claim 1, wherein the molecular sieve material has a particle size of approximately 20 to 150 mesh.

5. A filter according to claim 1, containing between 10 and 300 milligrams of the molecular sieve material.

6. A filter according to claim 5, containing between 50 and 100 milligrams of the molecular sieve material.

7. A filter according to claim 1 wherein the artificial zeolite material is disposed between two sections of fibrous filter plug material.

References Cited

UNITED STATES PATENTS 3,251,365   5/1966   Keith et al. _____ 131—10

FOREIGN PATENTS 932,570   7/1963   Great Britain.

SAMUEL KOREN, *Primary Examiner.*

D. J. DONOHUE, *Assistant Examiner.*